INVENTOR.
WALTER E. DUERINGER
BY Raymond W. Jenkins
ATTORNEY

INVENTOR.
WALTER E. DUERINGER
BY
Raymond D. Jenkins
ATTORNEY

Patented Feb. 13, 1951

2,541,219

UNITED STATES PATENT OFFICE 2,541,219

HUMIDITY REGULATING SYSTEM

Walter E. Dueringer, Shaker Heights, Ohio, assignor to Bailey Meter Company, a corporation of Delaware Application December 28, 1946, Serial No. 719,021

13 Claims. (Cl. 236—44)

My invention relates to systems for regulating the amount of moisture in an air stream, and more particularly to systems for supplying moisture to an air stream in such a manner that its moisture content is maintained at some predetermined value.

It is sometimes desirable that a stream of air having a constant moisture content be available for use in industrial operations. For instance, in the making of iron castings it has been found that a much greater percentage of the castings have the desired silicon content in the iron when air with controlled moisture content is supplied to the blast furnace than when natural air is supplied. Tests have indicated that the supply of air with a moisture content fixed at a value slightly greater than the upper limit of the moisture content in natural air results in the production of about 50% more castings having a silicon content within the desired range.

It is therefore an object of my invention to provide an improved system for regulating the moisture content in the air of a supply line. Another object is to provide in an improved moisture regulating system a balanceable network which is responsive to the humidity of the air in a supply line and operates to control the supply of moisture to such line. Yet another object is to provide an improved system for supplying moisture to an air line in a manner to maintain the moisture content of the air at a predetermined value. Other objects will appear in the course of the following description.

In accordance with my invention a sample of air is taken from the supply line and cooled to some predetermined value. A balanceable network is then made responsive to the temperature of the cooled sample and operates to control a valve in a steam or water line communicating with the supply line at the upstream side of the point where the sample is taken. The balanceable network may include wet and dry bulb temperature responsive elements which are subjected to the cooled air sample and operate on variations of temperature from desired values to effect the operation of a motor for positioning the valve in the steam or water line. If the temperature of the sample is regulated so that the difference between its wet and dry bulb temperature readings is constant, then the balanceable network may include a single element responsive to the temperature of the sample since this temperature is a direct indication of the moisture in the sample. In another arrangement, the valve in the steam line may be positioned in response to variations in the rate of flow in the air supply line and in the steam line as well as to variations in humidity of the sample.

In the accompanying drawings there are shown several forms which my invention may assume in practice.

Figure 1:
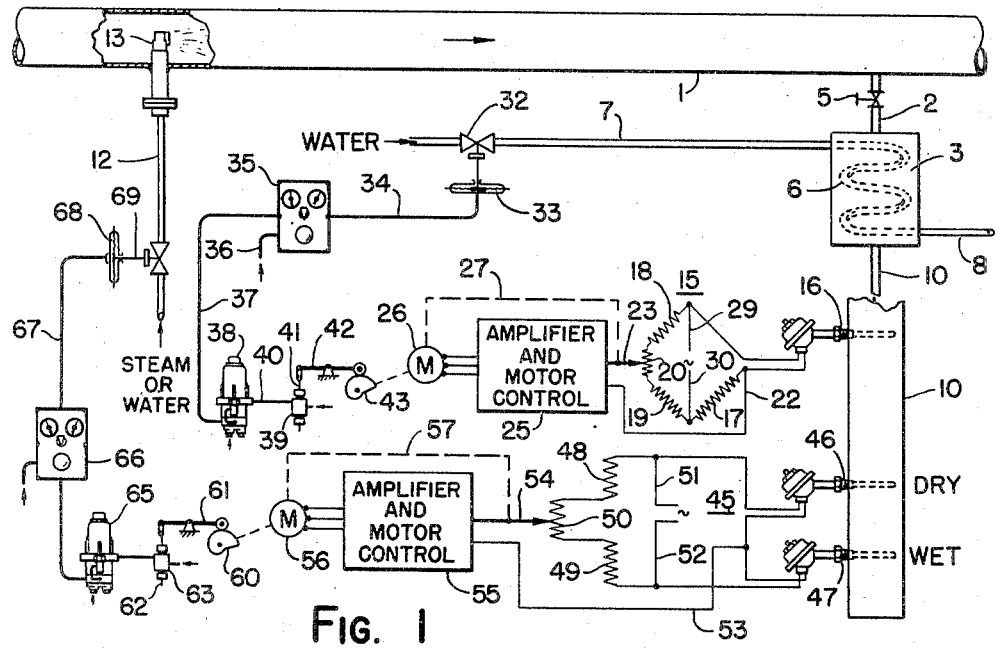
Fig. 1 is a schematic diagram of a system for maintaining the moisture content of the air in a supply line at a desired value.

Referring to the drawings it will be noted that I have shown in each form of my invention a conduit 1 through which air or other gaseous fluid is moved in the direction of the arrow by any suitable means, to a point of use, not shown. Associated with the conduit 1 is a system which operates in response to variations in humidity of the air for controlling the supply of moisture thereto in a manner to maintain a desired specific humidity. The system includes in each case a conduit 2 connecting the conduit 1 to a chamber 3 and continuously supplying a sample of air or gas to the latter under the control of a manually-operated valve 5. Arranged in the chamber is a suitable cooling means, such as a coiled tube 6, and a cooling fluid, such as water, is supplied through a conduit 7 to one end of the coiled tube while a discharge conduit 8 conducts the fluid from the tube to a suitable point of discharge. A conduit 10 conducts the cooled air sample from the chamber 3 to the atmosphere, and systems including balanceable circuits having elements responsive to the temperature of the cooled sample operate to control the flow of water through the conduit 7 and the flow of moisture, indicated herein as steam or water, through a conduit 12 to a nozzle 13 in the air supply line 1.

As shown in Fig. 1, the flow of water in the conduit 7 is controlled by a system including a Wheatstone bridge circuit 15 having a temperature responsive element 16 forming one of its legs and projecting into the conduit 10 to be subjected to the cooled air sample. A fixed resistance 17 forms another leg of the bridge, and fixed resistances 18 and 19 with a variable resistance 20 connected between them, form the other two legs of the bridge. A conductor 22 leading from the bridge at a point between the element 16 and the resistance 17, and a movable contact 23 for the resistance 20 are connected through an amplifier and motor control circuit 25 which may be similar to that shown in the patent application to A. J. Hornfeck, Serial No. 633,891, to a motor 26 for effecting operation of the latter in one direction or another depending upon the direction of bridge unbalance. Connections 27 are provided between the motor and the contact 23 for positioning the latter to rebalance the bridge when the motor is caused to operate by reason of an unbalanced condition. Power input to the bridge is supplied from a suitable source of alternating current through conductors 29 and 30.

Arranged in the conduit 7 is a valve 32 for controlling the flow of water to the tube 6 in the cooling chamber 3, and associated with the valve is a pressure actuated device, such as a diaphragm 33, to which pressure fluid may be supplied for positioning the valve. A conduit 34 communicates with the diaphragm and is adapted to be connected by a manually operable selector valve 35 of the type disclosed in the Patent 2,202,286 to H. H. Gorrie, to a conduit 36 leading to a source of pressure fluid or to a conduit 37 leading to a standardizing relay 38 of the type disclosed in the patent to Gorrie Re. 21,804. A pilot valve 39 of the type disclosed in the Patent 2,054,464 to Johnson, controls the flow of pressure fluid to the standardizing relay through a conduit 40 and has a valve element 41 adjustably connected to one end of a pivoted lever 42 which has its other end acted upon by a cam 43 operatively connected to the motor 26.

When the temperature of the air in the conduit 10 is at the desired value, the bridge 15 is balanced and the motor 26 is stationary. The pilot valve 39 at this time is in a position to maintain a balancing pressure in the standardizing relay through the condut 40, and the relay maintains a constant pressure on the diaphragm 33 through the selector valve 35 (assuming the latter to be in a position for automatic control) for holding the valve 32 in a partially opened position. If the temperature of the air in conduit 10 drops below the desired value, the bridge 15 becomes unbalanced and causes the motor 26 to operate and move the contact 23 to a position for rebalancing the bridge. At the same time, the motor drives the cam 43 and positions the valve element 41 of the pilot valve for increasing the pressure on the relay 38 and causing the latter to operate and increase the pressure on the diaphragm 33 so as to effect a closing movement of the valve 32 for reducing the flow of water until the temperature of the air sample increases and causes the bridge to become unbalanced in the opposite direction. The motor then operates to move the valve element 41 of the pilot valve to a position to rebalance the standardizing relay, and to stop the closing movement of the valve 92. If the temperature in conduit 10 increases above the desired value, the system operates to open the valve 32 and increase the flow of water to the cooling tube until the temperature is reduced again to the value desired. It will be seen that a variation of temperature from the desired value in either direction causes an operation of the sytsem to position the valve 32 so as to regulate the flow of water in a manner to return the temperature to the desired value. If it is desired to maintain a different temperature of the air sample in conduit 10, the connections between the valve element 41 and the lever 42 may be changed so that a bridge balance at the new temperature will position the valve element to maintain the predetermined balancing pressure on the relay 38.

With the temperature of the air in conduit 10 held at a constant value, the difference in temperature between the wet and dry bulb temperature responsive elements will be indicative at all times of the amount of moisture in the air. The system controlling the supply of moisture to conduit 1 may therefore include a Wheatstone bridge circuit 45 having a dry bulb temperature responsive element 46 forming one of its legs, and a wet bulb temperature responsive element 47 forming another of its legs. The elements 46 and 47 may be of any standard commercial design and are projected into the conduit 10 where they are subjected to the cooled air sample. Fixed resistances 48 and 49 with a variable resistance 50 connected between them, form the other two legs of the bridge. Power is supplied to the bridge from a source of alternating current through conductors 51 and 52 connected to opposite points of the bridge. The output of the bridge is supplied through a conductor 53 and a movable contact 54 for the resistance 50, to an amplifier and motor control circuit 55, similar to the circuit 25, for a motor 56. The motor operates on an unbalance of the bridge to position the contact 54 through connections 57 and rebalance the bridge. At the same time, the motor operates through connections including a cam 60 and pivoted lever 61, to position a valve element 62 of a pilot valve 63 which is similar to the valve 39. The pivot valve controls the flow of pressure fluid to a standardizing relay 65, similar to the relay 38, and the relay 65 determines the flow of pressure fluid through a selector valve 66, like the valve 35, and a conduit 67 to a diaphragm 68 connected to a valve 69 in the steam or water line 12.

When the moisture content of the air in the supply line 1 is at the desired value, the resistances of the elements 46 and 47 will be such that, on a balance of the bridge circuit 45, the valve element 62 will be in a position to maintain a predetermined balancing pressure on the relay 65, and the relay will maintain a pressure on the diaphragm 68 to hold the latter in a partially opened position. If the moisture content increases above the desired value, the bridge circuit 45 becomes unbalanced and causes the motor 56 to operate and position the contact 54 for rebalancing the bridge. At the same time, the motor moves the valve element 62 in an opening direction to increase the pressure on the relay, and the relay operates to increase the pressure on the diaphragm 68 for moving the valve 69 toward its closed position. A reduction of the moisture content in the air stream causes the elements 46 and 47 to unbalance the bridge 45 in the opposite direction and effect an operation of the motor 56 to position the valve 62 so as to reduce the pressure on the relay. The pressure reduction on the relay results in an operation of the latter to reduce the pressure on the diaphragm 68 and permit the valve 69 to move toward its open position for supplying a greater quantity of steam to the conduit 1.

Figure 2:
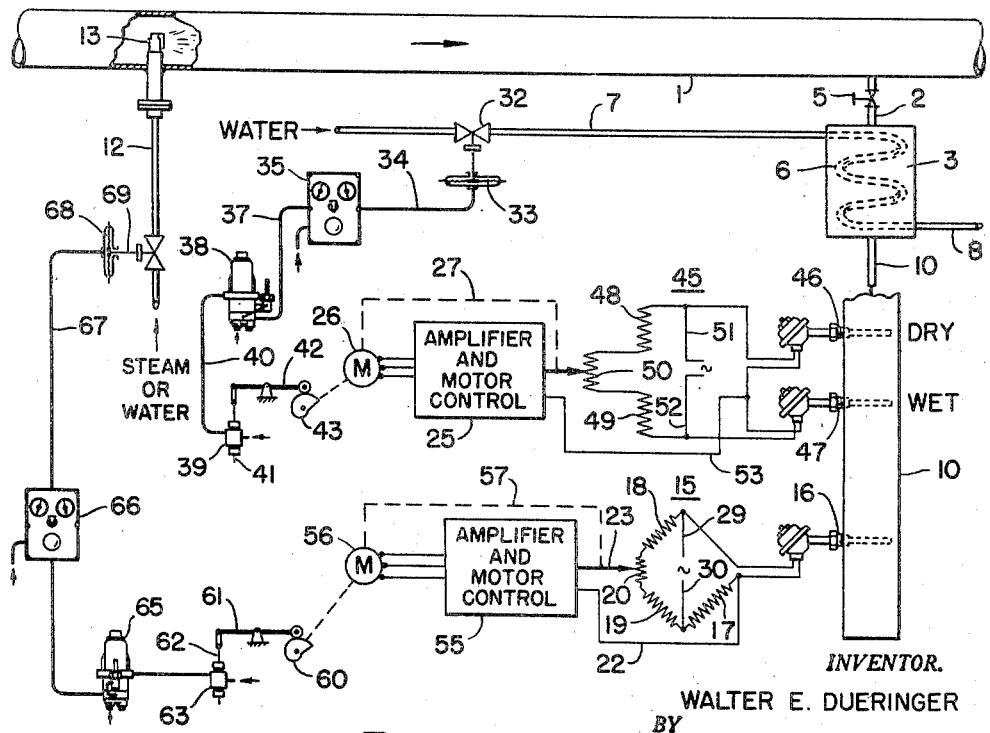
Fig. 2 is a schematic diagram of a system similar to Fig. 1 but having a different arrangement of temperature responsive elements in the balanceable networks.

Fig. 2 shows a system like that of Fig. 1 except that the bridge circuit 45 controls the operation of the motor 26 which positions the pilot valve 39 to regulate the pressure on the diaphragm 33 controlling the valve 32. In this case, the valve element 41 is in a position to maintain a balancing pressure on the relay 38 when the bridge 45 is balanced and the temperature of the air sample containing the desired amount of moisture is at a predetermined value above the value at which the resistances of the wet and dry bulb temperature responsive elements 46 and 47 are equal. The air sample at this time is in a predetermined saturated condition and its temperature is a direct indication of the humidity in conduit 1. The bridge circuit 15 with its element 16 responsive to the temperature of the air sample, controls the pilot valve 63 to regulate the pressure on the diaphragm 68 controlling the valve 69 in the steam line 12. The valve element 62 of the pilot valve maintains a balancing pressure on the relay 65 when the temperature of the air sample is at the predetermined value above the saturation temperature and the bridge 15 is balanced.

Assuming that the bridge 45 is balanced and positions the pilot valve 39 to produce the desired balancing pressure on the relay 38 when there is a 3° difference between the temperatures of the wet and dry bulb elements 46 and 47, then any change of the humidity in conduit 1 will mean that saturation of the cooled air sample will be reached at a different temperature and the 3° difference between the elements 46 and 47 will exist at a different temperature. The bridge 45 will then control the pressures on diaphragm 33 to regulate the flow of water and maintain the new temperature at which the 3° difference between the elements 46 and 47 exists. The new temperature will cause an unbalance of the bridge 15 and a positioning of the valve 69 in the steam or water line to vary the supply of moisture until the humidity in conduit 1 reaches the desired value. When this value is reached, the 3° difference between the elements 46 and 47 exist at the temperature which causes the bridge 15 to balance and produce the desired balancing pressure on the relay 65.

If it is assumed that the specific humidity in conduit 1 is at a predetermined value and it is desired to maintain this humidity, then the operation of the control system will be as follows. The sample of the air will be passed over the tube 6 and cooled until it drops to a temperature at which a 3° difference exists between the elements 46 and 47. At this time the bridge 45 is balanced and positions the pilot valve 39 to maintain a balancing pressure on the relay 38 which in turn subjects the diaphragm 33 to a pressure for holding the valve 32 in a partially opened position. If the temperature drops below the value producing the 3° difference, the bridge 45 becomes unbalanced and positions the pilot valve to increase the pressure on the relay, and the relay causes the pressure on the diaphragm to increase and close the valve 32 until the cooling effect diminishes sufficiently to cause the temperature to increase to the value producing the 3° difference. An increase in temperature above this value results in a bridge unbalance in the opposite direction and an opening of valve 32 until the temperature is reduced to produce the 3° difference. The bridge 15 will be adjusted to balance and position the valve element 62 so as to maintain the balancing pressure on the relay 65 when the element 16 is subjected to the temperature at which the difference of 3° exists between elements 46 and 47. As long as the humidity remains at the predetermined value, the bridge 45 will tend to hold the temperature of the air sample at the value at which the bridge 15 balances and positions the valve 62 to maintain the balancing pressure on the relay 65. If the humidity of the air in conduit 1 changes, the bridge 45 will establish a new dry bulb temperature in conduit 10 which corresponds to the 3° difference with the humidity at the new value, and this temperature is such as to unbalance the bridge 15 and cause it to position the valve 62 and maintain an unbalanced pressure on the relay 65. The unbalanced pressure causes the valve 69 to change the flow of steam or water to conduit 1 until the humidity therein returns to the predetermined value and causes the bridge 45 to return the temperature of the air sample to the value at which bridge 15 positions valve 62 to subject the relay 65 to a balancing pressure.

Figure 3:
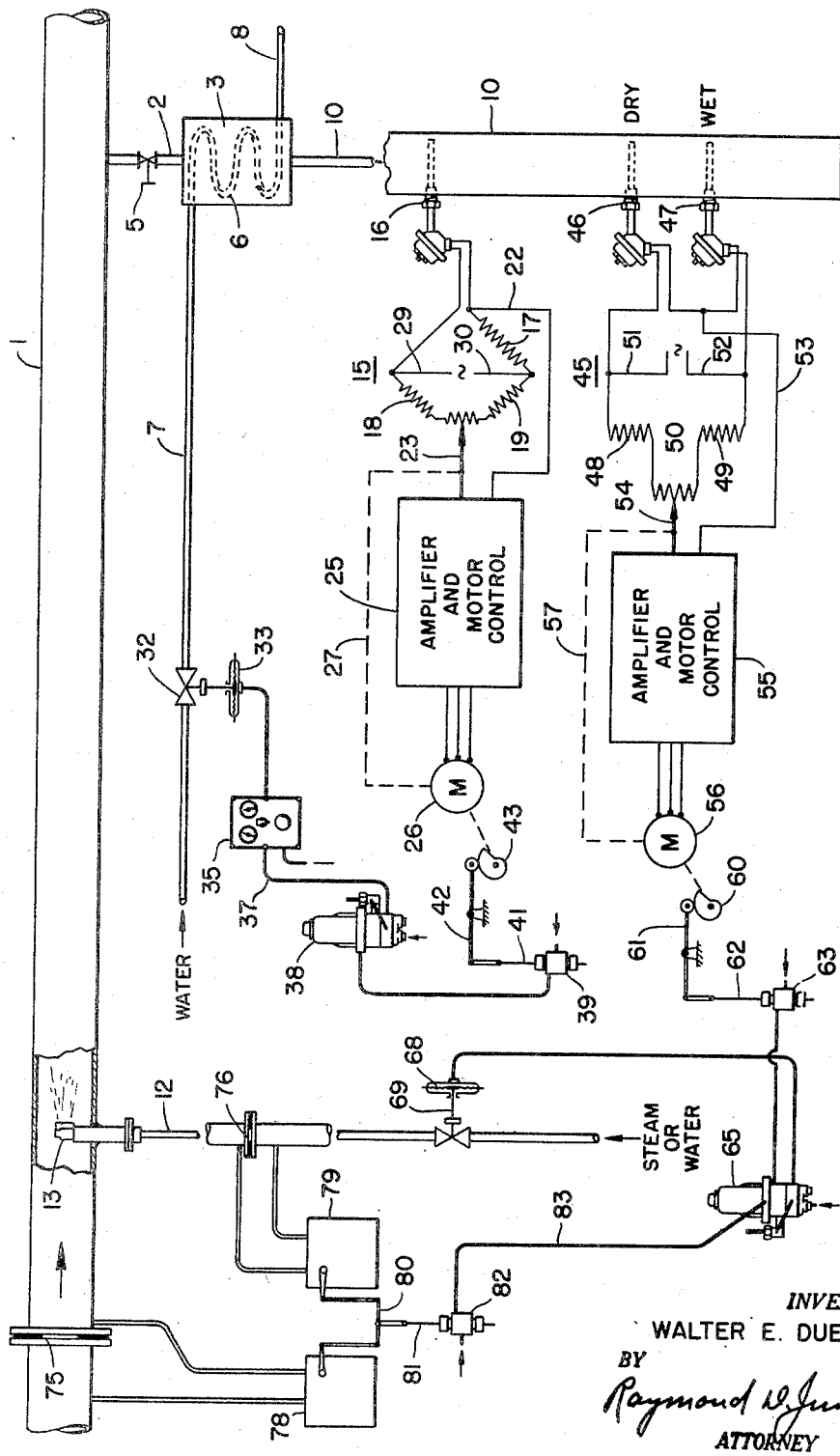
Fig. 3 shows another system having a 3-element control for the valve in the steam line.

Fig. 3 shows a system like that of Fig. 1 except that the valve 69 is positioned by a pressure which is determined by the humidity of the air sample as well as by the rate of air flow in the conduit 1 and the rate of steam or water flow in conduit 12. Arranged in the conduits 1 and 12 are orifices 75 and 76 for producing differential pressures which are subjected on suitable pressure responsive devices 78 and 79. These devices may be flow meters, as shown in the Patent 2,257,905 to H. H. Gorrie, and may be connected through a differential linkage 80, similar to the Gorrie patent, to the valve stem 81 of a pilot valve 82 which regulates the supply of pressure fluid through a conduit 83 to the standardizing relay 65. The pilot valve 63 as described in connection with Fig. 1, is adapted to subject the relay to a pressure varying with the humidity in conduit 1. When the humidity in conduit 1 is as it should be and the flow of fluids through conduits 1 and 12 are such that they tend to maintain the desired humidity, then the relay 65 is subjected to balanced pressures, and the pressure on the diaphragm 68 is held at a fixed value. Any change in the flow of fluid through conduits 1 or 12, or any change in the humidity will cause the pressures on the relay 65 to become unbalanced and cause the latter to operate and change the pressure on the diaphragm 68 until the balanced condition is restored. A closer control of the humidity may be obtained with this arrangement since a condition tending to produce a variation from the desired value will be detected and corrected before any appreciable change in the value takes place.

As a result of my invention there is provided an improved system for regulating the moisture content in an air or gas stream. The system has been described in each of its forms as including means for reducing the temperature of the air sample to some value. It will be appreciated that the sample could as well be heated, the water or fluid passing through the conduit 7 in such case being warmer than the air sample taken from the conduit 1. Instead of supplying moisture to the conduit 1 in the form of steam, a flow of water may be passed through the conduit 12 and injected through the nozzle 13 in the form of a fine spray to the interior of conduit 1. In the form of the invention shown in Fig. 2 it is not necessary that the temperature of the sample be reduced to a value at which a 3° difference exists between elements 46 and 47. The 3° spread is merely used as an example, and the spread could as well be any value which might be reached either by heating or cooling of the air sample.

While I have shown and described several forms which my invention may assume in practice, it will be understood that these forms are merely illustrative and that my invention may be modified and embodied in various other forms without departing from its spirit or the scope of the appended claims.

What I claim as new, and desire to secure by Letters Patent of the United States, is:

1. A system for controlling the humidity of a stream of gaseous fluid comprising, in combination, means for removing a sample of gaseous fluid from said stream, means for regulating the temperature of said sample so as to maintain it at a constant value, means for supplying moisture to said stream at the upstream side of the point from which said sample is removed, valve means for controlling the supply of moisture from said last mentioned means, and means including wet and dry bulb temperature responsive elements subjected to said sample and operating in response to the temperature difference between said elements for controlling said valve means in a manner to maintain a predetermined humidity of the air stream.

2. A system for controlling the humidity of a stream of gaseous fluid comprising, in combination, means for removing a sample of gaseous fluid from said stream, means including a balanceable network having an element responsive to the temperature of said sample for regulating the temperature so as to maintain it at a constant value, means for supplying moisture to said stream, valve means for controlling the supply of moisture from said last mentioned means, and means including a bridge having wet and dry bulb temperature responsive elements forming separate bridge legs and subjected to said sample after its temperature has been regulated, said last mentioned means operating to control said valve means in a manner to maintain a predetermined humidity of the air stream.

3. A system for controlling the humidity of an air stream comprising, in combination, means including a heat exchanger for cooling an air sample taken from said air stream, means for supplying a cooling medium through said heat exchanger, valve means for controlling the supply of cooling medium from said last mentioned means, means including a balanceable network having an element responsive to the temperature of said cooled air sample for controlling said valve means, means for supplying moisture to said air stream at the upstream side of the point from which the air sample is taken, valve means for controlling the supply of moisture from said moisture supplying means, and means including a balanceable network having wet and dry bulb temperature responsive elements subjected to said cooled air sample, said last mentioned means operating in response to the difference between wet and dry bulb temperatures for controlling said second mentioned valve means in a manner to maintain a predetermined humidity of the air stream.

4. A system for controlling the humidity of an air stream comprising, in combination, means including a heat exchanger for cooling an air sample taken from said air stream, means for supplying a cooling medium through said heat exchanger, valve means for controlling the supply of cooling medium from said last mentioned means, means including a balanceable network having wet and dry bulb temperature responsive elements subjected to said cooled air sample, said last mentioned means controlling said valve means, means for supplying moisture to said air stream at the upstream side of the point from which the air sample is taken, valve means for controlling the supply of moisture from said last mentioned means, and means including a balanceable network having a temperature responsive element subjected to said cooled air sample for controlling said last mentioned valve means.

5. A system for controlling the humidity of an air stream comprising, in combination, means including a heat exchanger for cooling an air sample taken from said air stream, means for supplying a cooling medium through said heat exchanger, pressure responsive valve means for controlling the supply of cooling medium from said last mentioned means, means including a Wheatstone bridge having as one of its legs an element responsive to the temperature of the cooled air sample, means operative on an unbalance of said bridge for supplying fluid to said valve means at a continuously increasing or decreasing pressure depending upon the direction of unbalance, means for supplying moisture to said air stream at the upstream side of the point from which the air sample is taken, pressure responsive valve means for controlling the supply of moisture from said last mentioned means, and means including a Wheatstone bridge having wet and dry bulb temperature responsive elements forming a pair of its legs and subjected to the cooled air sample, said last mentioned means operating in response to the difference between wet and dry bulb temperatures for supplying fluid to said second mentioned valve means at a continuously increasing or decreasing pressure depending upon the direction of unbalance.

6. A system for controlling the humidity of an air stream comprising, in combination, means including a heat exchanger for cooling an air sample taken from said air stream, means for supplying a cooling medium through said heat exchanger, valve means for controlling the supply of cooling medium from said last mentioned means, means including a Wheatstone bridge having wet and dry bulb temperature responsive elements subjected to the cooled air sample and operating to control said valve means, means for supplying moisture to said air stream at the upstream side of the point from which the air sample is taken, valve means for controlling the supply of moisture through said last mentioned means, and means including a Wheatstone bridge having as one of its legs a temperature responsive element subjected to the cooled air sample and operating to control said last mentioned valve means.

7. A system for controlling the humidity of an air stream comprising, in combination, means including a heat exchanger for cooling an air sample taken from said air stream, means for supplying a cooling medium through said heat exchanger, valve means for controlling the supply of cooling medium from said last mentioned means, means including a Wheatstone bridge having as one of its legs an element responsive to the temperature of the cooled air sample and operating to control said valve means, means for supplying moisture to said air stream at the upstream side of the point from which the air sample is taken, valve means for controlling the supply of moisture from said last mentioned means and means for controlling said last mentioned valve means, said last mentioned means including a Wheatstone bridge having wet and dry bulb temperature responsive elements subjected to the cooled air sample, and means responsive to the rate of flow of said air stream and to the rate of flow of moisture to said air stream.

8. A system for controlling the humidity of a stream of gaseous fluid comprising, in combination, means for removing a sample of gaseous fluid from said stream, means for regulating the temperature of said sample so as to maintain it at a constant value, means for supplying moisture to said stream, valve means for controlling the supply of moisture from said last mentioned means, and means for controlling said valve means including means responsive to the difference between wet and dry bulb temperatures of said cooled sample, to the rate of flow of said air stream, and to the rate of flow of moisture to said air stream.

9. A system for controlling the humidity of a stream of gaseous fluid comprising, in combination, means for removing a sample of gaseous fluid from said stream, means for regulating the temperature of said sample so that the difference between its wet and dry bulb temperatures is constant, means for supplying moisture to said stream at the upstream side of the point from which said sample is removed, valve means for controlling the supply of moisture from said supply means, and means including an element responsive to the regulated temperature of said sample for controlling said valve means.

10. A system for controlling the humidity of a stream of gaseous fluid comprising, in combination, means for removing a sample of gaseous fluid from said stream, a heat exchanger having a flow passage receiving said gas sample, means for discharging a cooling medium through another flow passage in said heat exchanger, pressure responsive valve means for controlling the flow of cooling medium through said discharging means, a first balanceable network having a temperature responsive element subjected to said sample after passing through said heat exchanger, means operative on an unbalance of said first network for supplying fluid to said valve means at a continuously increasing or decreasing pressure depending upon the direction of unbalance, means for supplying moisture to said air stream at the upstream side of the point from which the air sample is taken, pressure responsive valve means controlling the supply of moisture from said moisture supply means, a second balanceable network including wet and dry bulb temperature responsive elements subject to said sample after passing through said heat exchanger, and means operative on an unbalance of said last mentioned network for supplying fluid to said second mentioned valve means at a continuously increasing or decreasing pressure depending upon the direction of unbalance.

11. A system for controlling the humidity of a stream of gaseous fluid including in combination, means for removing a sample of gaseous fluid from said stream, means for regulating the temperature of said sample so as to maintain it at a constant value, means for supplying moisture to said stream at the upstream side of the point from which said sample is removed, valve means for controlling the supply of moisture from the said last mentioned means, and means including two elements one of which is responsive to the wet bulb temperature of said sample and the other of which is responsive to the dry bulb temperature of said sample for controlling said valve means.

12. A system for controlling the humidity of a stream of gaseous fluid including in combination, means for removing a sample of gaseous fluid from said stream, means including a balanceable network having an element responsive to the temperature of said sample for regulating sample temperature to a constant value, means for supplying moisture to said stream at the upstream side of the point from which said sample is removed, valve means for controlling the supply of moisture from said last mentioned means, and means including a balanceable network having two elements one of which is responsive to the wet bulb temperature and the other of which is responsive to the dry bulb temperature of said sample for controlling said valve means.

13. A system for controlling the humidity of an air stream including in combination, means including a heat exchanger for cooling an air sample taken from said air stream, means for supplying a cooling medium through said heat exchanger, valve means for controlling the supply of cooling medium from said last mentioned means, means including a balanceable network having an element responsive to the temperature of said cooled air sample for controlling said valve means, means for supplying moisture to said air stream at the upstream side of the point from which the air sample is taken, valve means for controlling the supply of moisture from said moisture supplying means, and means including a balanceable network having two elements one of which is responsive to the wet bulb and the other of which is responsive to the dry bulb temperatures of said cooled air sample for controlling said last mentioned valve means.

WALTER E. DUERINGER.

REFERENCES CITED

The following references are of record in the file of this patent:

UNITED STATES PATENTS

| Number | Name | Date |
|---|---|---|
| 1,167,740 | Carrier | Jan. 11, 1916 |
| 1,915,971 | Beane et al. | June 27, 1933 |
| 2,128,176 | Bast et al. | Aug. 23, 1938 |
| 2,130,093 | Kettering | Sept. 13, 1938 |
| 2,173,802 | Downs et al. | Sept. 19, 1939 |
| 2,275,317 | Ryder | Mar. 3, 1942 |